US012008861B2

(12) United States Patent
Nelson

(10) Patent No.: US 12,008,861 B2
(45) Date of Patent: Jun. 11, 2024

(54) CONSOLIDATED GAME PACKAGES FOR ELECTRONIC GAMING MACHINES

(71) Applicant: IGT, Las Vegas, NV (US)

(72) Inventor: Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 17/731,196

(22) Filed: Apr. 27, 2022

(65) Prior Publication Data

US 2023/0351843 A1 Nov. 2, 2023

(51) Int. Cl.
*G07F 17/32* (2006.01)

(52) U.S. Cl.
CPC ................................ *G07F 17/3227* (2013.01)

(58) Field of Classification Search
CPC ............................ G07F 17/3227; G07F 17/32
See application file for complete search history.

(56) References Cited

U.S. PATENT DOCUMENTS

2003/0195031 A1* 10/2003 O'Donovan ............ G07F 17/32 463/16
2005/0054448 A1* 3/2005 Frerking ............... A63F 13/358 463/42
2005/0239546 A1* 10/2005 Hedrick .............. G07F 17/3227 463/29
2007/0032288 A1* 2/2007 Nelson .................. G07F 17/323 463/16
2007/0060363 A1* 3/2007 Nguyen .................. G07F 17/34 463/42

* cited by examiner

*Primary Examiner* — Kevin Y Kim
(74) *Attorney, Agent, or Firm* — Sage Patent Group

(57) ABSTRACT

A gaming device includes a processor circuit and a memory including machine-readable instructions. When executed by the processor circuit, the instructions cause the processor circuit to access a game software package comprising a plurality of configurations of a wagering game. The instructions further cause the processor circuit to determine whether the gaming device is authorized to access a first subset of configurations of the wagering game. The instructions further cause the processor circuit to, based on the determination that the gaming device is authorized to access the first subset of configurations of the wagering game, enable play of the first subset of configurations of the wagering game at the gaming device.

17 Claims, 10 Drawing Sheets

CONSOLIDATED GAME PACKAGES FOR ELECTRONIC GAMING MACHINES

BACKGROUND

Embodiments described herein relate to electronic gaming machines (EGMs), and in particular to consolidated game packages in EGMs, and related systems, devices, and methods. EGMs in a gaming environment, such as a casino environment, have many different types of hardware configurations and form factors, and may vary from casino to casino and market to market for example. Typically, game packages are configured individually for each hardware configuration, form factor, and/or market, with every package being subject to regulatory approval individually as well. This can lead to delays in regulatory approval, inconsistent results, and difficulties in deploying different versions of the same game in an efficient manner. Thus, there is a need to obtain approval for game packages for different EGMs and to distribute the game packages more efficiently.

SUMMARY

According to some embodiments, a gaming device includes a processor circuit and a memory including machine-readable instructions. When executed by the processor circuit, the instructions cause the processor circuit to access a game software package comprising a plurality of configurations of a wagering game. The instructions further cause the processor circuit to determine whether the gaming device is authorized to access a first subset of configurations of the wagering game. The instructions further cause the processor circuit to, based on the determination that the gaming device is authorized to access the first subset of configurations of the wagering game, enable play of the first subset of configurations of the wagering game at the gaming device.

According to some embodiments, a method includes accessing, by a processor circuit of a gaming device, a game software package comprising a plurality of configurations of a wagering game. The method further includes determining, by the processor circuit, a hardware configuration of the gaming device. The method further includes comparing, by the processor circuit, the hardware configuration of the gaming device to an authorized hardware configuration associated with a first subset of configurations of the wagering game. The method further includes determining, by the processor circuit, whether the gaming device is authorized to access the first subset of configurations based on the comparing. The method further includes, based on determining that the gaming device is authorized to access the first subset of configurations of the wagering game, enabling play of the first subset of configurations of the wagering game at the gaming device.

According to some embodiments, a system includes a processor circuit and a memory including machine-readable instructions. When executed by the processor circuit, the instructions cause the processor circuit to access a game software package comprising a plurality of configurations of a wagering game. The instructions cause the processor circuit to determine an authorized hardware configuration for a first subset of configurations of the wagering game. The authorized hardware configuration includes a hardware configuration identifier of a plurality of hardware configuration identifiers. Each hardware configuration identifier corresponds to a unique combination of a plurality of hardware component identifiers. Each hardware component identifier corresponds to a hardware component of the authorized hardware configuration. The instructions cause the processor circuit to determine a of a combination of hardware components of a gaming device. The instructions cause the processor circuit to determine a hardware configuration identifier corresponding to a combination of hardware component identifiers corresponding to the determined combination of hardware components of the gaming device. The instructions cause the processor circuit to compare the hardware configuration identifier of the authorized hardware configuration to the determined hardware configuration identifier of the gaming device. The instructions cause the processor circuit to determine, based on the comparison, whether the gaming device is authorized to access the first subset of configurations. The instructions cause the processor circuit to, based on the determination that the gaming device is authorized to access the first subset of configurations of the wagering game, enable play of the first subset of configurations of the wagering game at the gaming device.

DETAILED DESCRIPTION

Embodiments described herein relate to electronic gaming machines (EGMs), and in particular to consolidated game packages in EGMs, and related systems, devices, and methods. In some embodiments, a gaming device includes a processor circuit and a memory including machine-readable instructions. When executed by the processor circuit, the instructions cause the processor circuit to access a game software package comprising a plurality of configurations of a wagering game. The instructions further cause the processor circuit to determine whether the gaming device is authorized to access a first subset of configurations of the wagering game. The instructions further cause the processor circuit to, based on the determination that the gaming device is authorized to access the first subset of configurations of the wagering game, enable play of the first subset of configurations of the wagering game at the gaming device.

Figure 1:
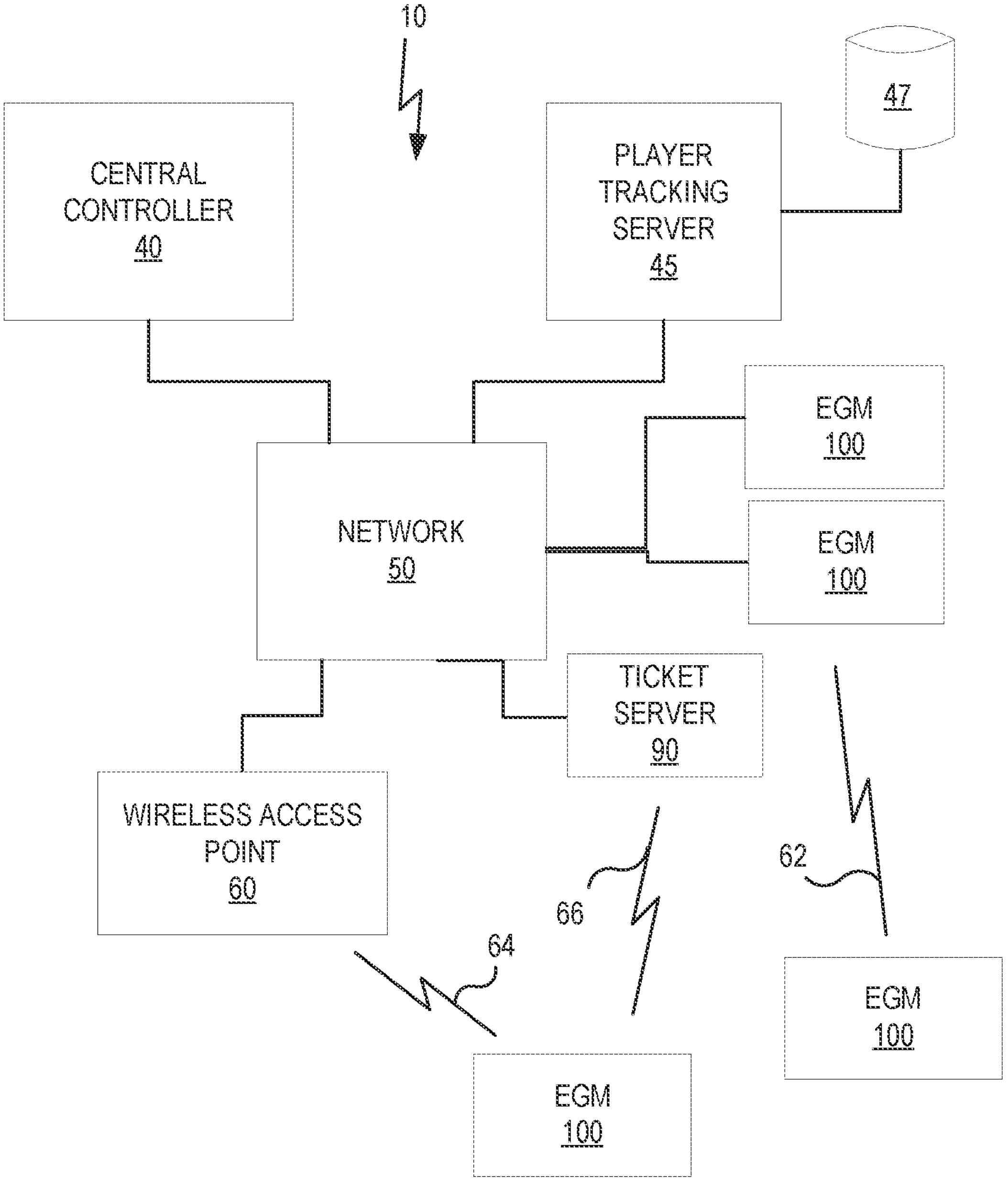
FIG. 1 is a schematic block diagram illustrating a network configuration for a plurality of gaming devices according to some embodiments.

Before describing these and other embodiments in detail, reference is made to FIG. 1, which illustrates a gaming system 10 including a plurality of gaming devices 100. As discussed above, the gaming devices 100 may be one type of a variety of different types of gaming devices, such as electronic gaming machines (EGMs), mobile devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processor circuit and at least one memory or storage device. Each gaming device 100 may include a processor circuit that transmits and receives events, messages, commands or any other suitable data or signal between the gaming device 100 and the central controller 40. The gaming device processor circuit is operable to execute such communicated events, messages or commands in conjunction with the operation of the gaming device 100. Moreover, the processor circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processor circuits. Moreover, in some embodiments, one or more of the functions of one or more gaming device processor circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processor circuit that transmits and receives events, messages, commands or any other suitable data or signal between the ticket server 90 and the central controller 40. The ticket server 90 processor circuit may be operable to execute such communicated events, messages or commands in conjunction with the operation of the ticket server 90. Moreover, in some embodiments, one or more of the functions of one or more ticket server 90 processor circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, an NFC link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
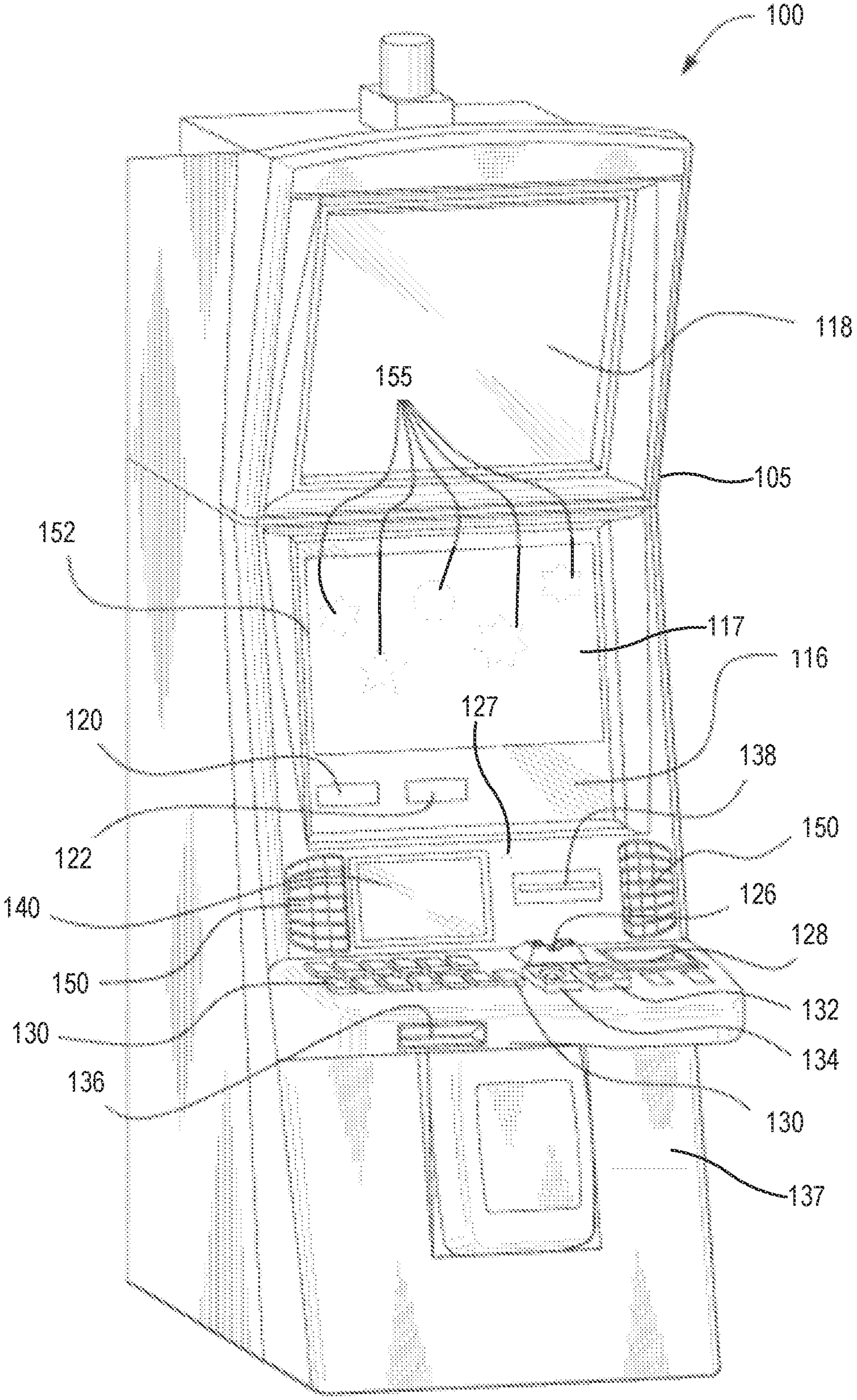
FIGS. 2A to 2E illustrate gaming devices according to various embodiments.
Figure 2B:
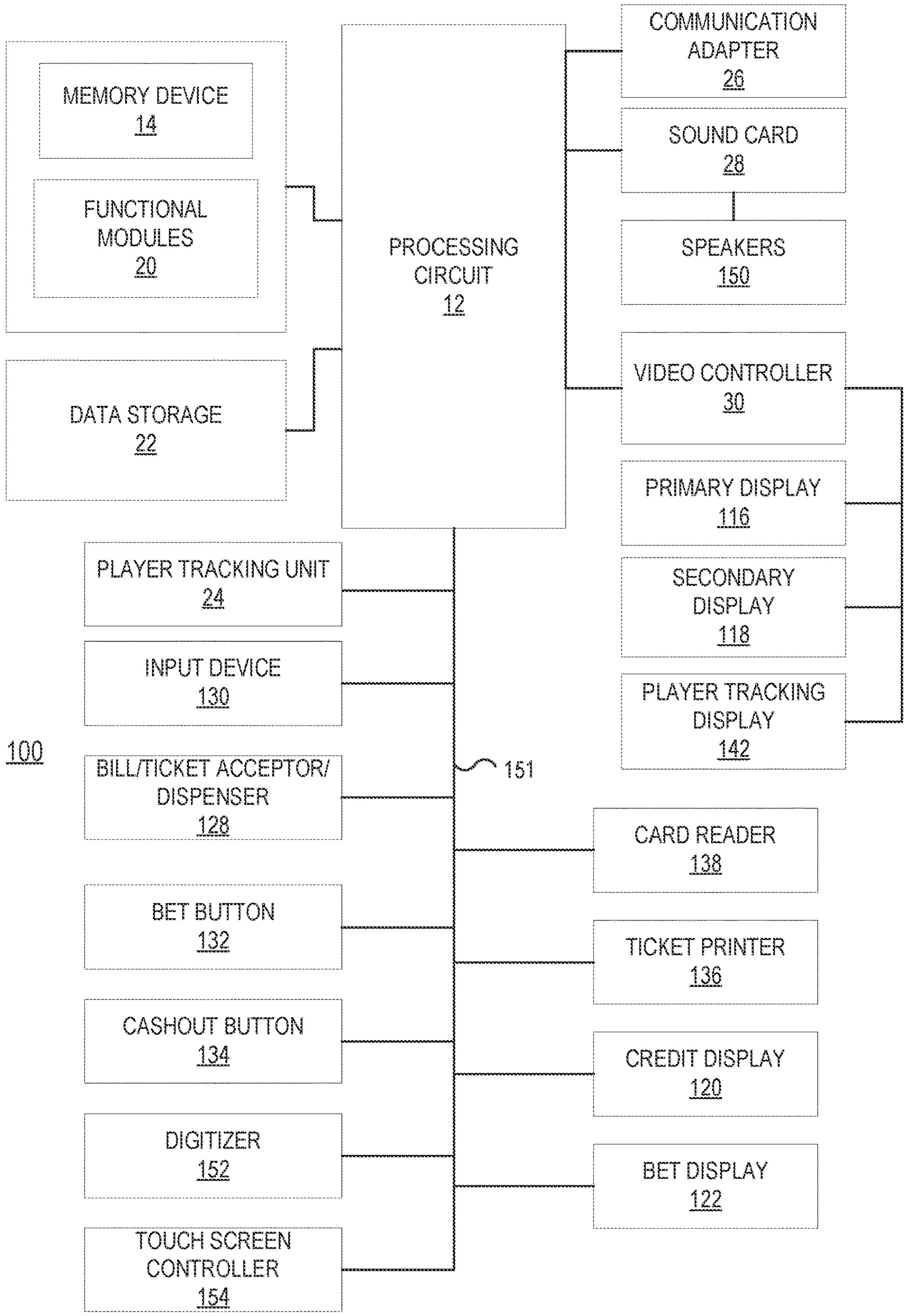
Figure 2C:
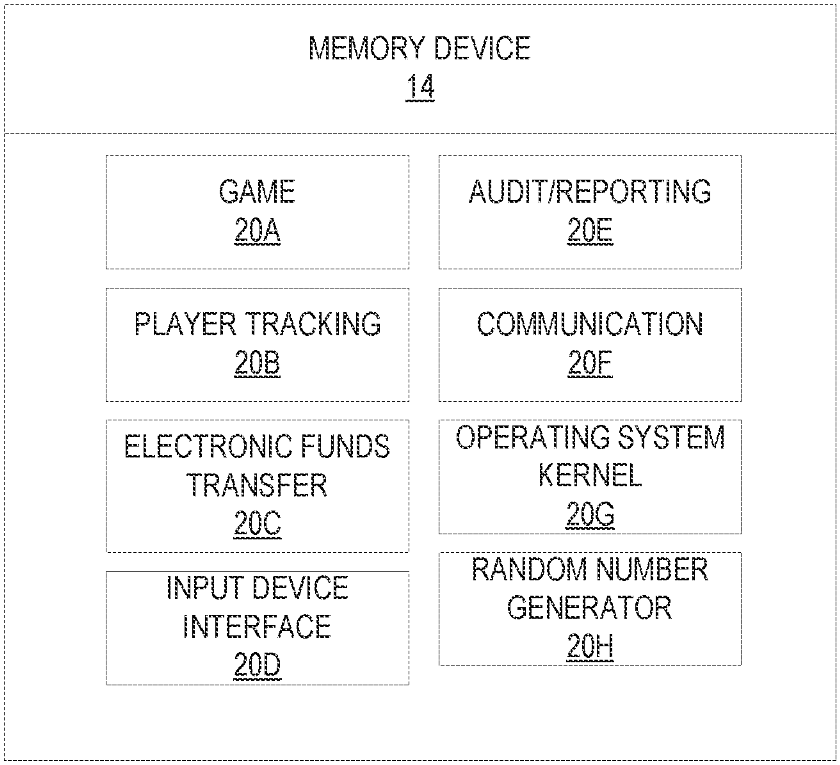

Embodiments herein may include different types of gaming devices. Various embodiments are illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments of the inventive concepts are not limited to the particular gaming device structures described herein.

Gaming devices 100 typically include a number of standard features, many of which are illustrated in FIGS. 2A and 2B. For example, referring to FIG. 2A, a gaming device 100 may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processor circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor circuit 12. In some embodiments however, the credit display 120 and/or the bet display 122 may be driven by the video controller 30. The gaming device 100 may also include a player tracking unit 24 for managing communications and functionality between the processor circuit 12 and certain peripherals and components. Player tracking units 24 may be standardized across machine types to operate interchangeably across a manufacturer's lineup.

Referring again to FIG. 2A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket printer 136, a bill/ticket acceptor/dispenser 128, that allows the player to deposit and/or receive tickets and/or currency into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processor circuit 12 that controls operations of the gaming device 100. Although illustrated as a single processor circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processor circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processor circuit 12. It will be appreciated that the components may be connected to the processor circuit 12 through a system bus 151, a communication bus and controller, such as a USB controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processor circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the gaming device 100 to communicate, for example, with a mobile communication device operated by a player.

The gaming device 100 may include one or more internal or external communication ports that enable the processor circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor circuit through a universal serial bus (USB) hub (not shown) connected to the processor circuit 12.

In some embodiments, the gaming device 100 may include a sensor, such as a camera 127, in communication with the processor circuit 12 (and possibly controlled by the processor circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processor circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

Many embodiments described herein employ gaming devices 100 that are land-based EGMs, such as banks of slot machines in a casino environment, but in some embodiments, a gaming device 100 may additionally or alternatively include a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a handheld device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
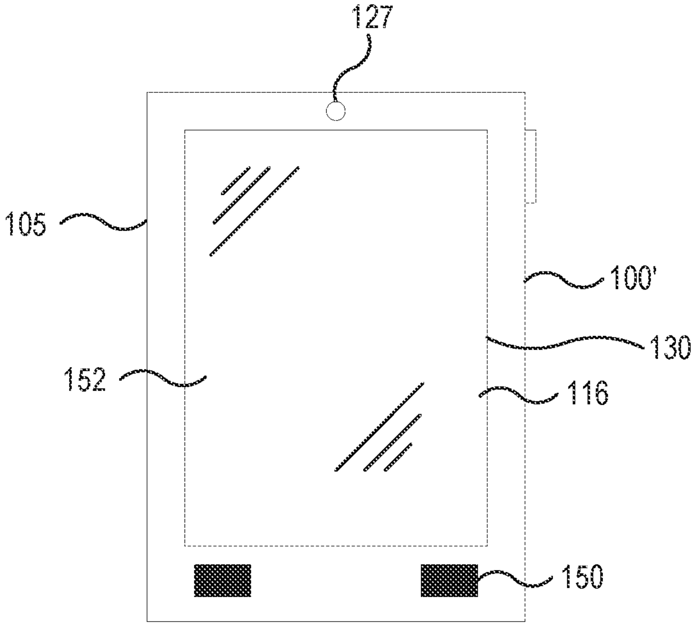

For example, referring to FIG. 2D, a gaming device 100' may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100', various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100' may omit certain features, such as a bill acceptor, a ticket generator, a coin acceptor or dispenser, a card reader, secondary displays, a bet display, a credit display, etc. Credits can be deposited in or transferred from the gaming device 100' electronically.

Figure 2E:
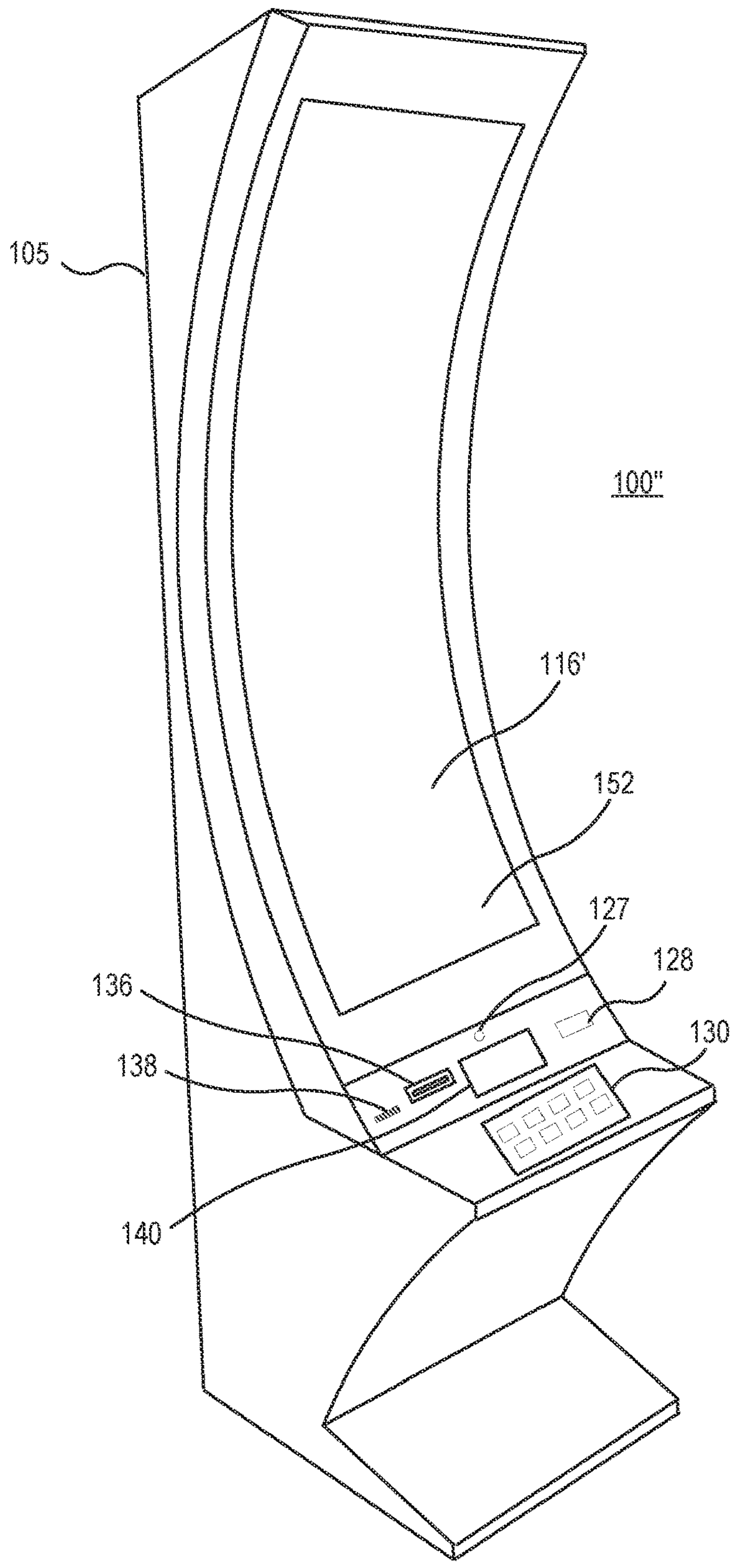

FIG. 2E illustrates a standalone gaming device 100", i.e., an EGM in this example, having a different form factor from the gaming device 100 illustrated in FIG. 2A. In particular, the gaming device 100" is characterized by having a large, high aspect ratio, curved primary display device 116' provided in the housing 105, with no secondary display device. The primary display device 116' may include a digitizer 152 to allow touchscreen interaction with the primary display device 116'. The gaming device 100" may further include a player tracking display 142, an input device 130, a bill/ticket acceptor 128, a card reader 138, and a bill/ticket dispenser 136. The gaming device 100" may further include one or more cameras 127 to enable facial recognition and/or motion tracking.

Although illustrated as certain gaming devices, such as electronic gaming machines (EGMs) and mobile devices, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3A:
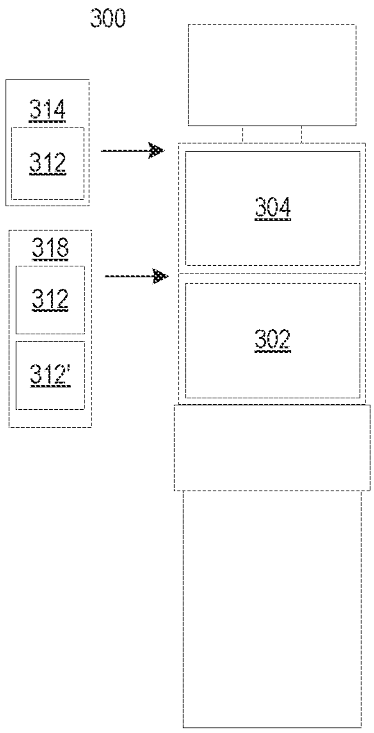
FIGS. 3A and 3B are views of game packages installed on EGMs having different hardware configurations and form factors, according to some embodiments.

Embodiments include a consolidated game package for a wagering game that allows a single game package to run on multiple different types of gaming devices, e.g., cabinets, hardware configurations, etc. For example, FIG. 3A illustrates a dual display gaming device 300 that includes a lower display 302 and an upper display 304. The lower display 302 in this example may display certain game elements, such as slot reels and slot symbols for example, while the upper display 304 in this example may display additional game graphics such as animations and bonus content. To make a particular game 312 available for play at the dual display gaming device 300, a conventional game package 314 includes a version of the game 312 individually configured for that particular dual display gaming device 300.

Figure 3B:
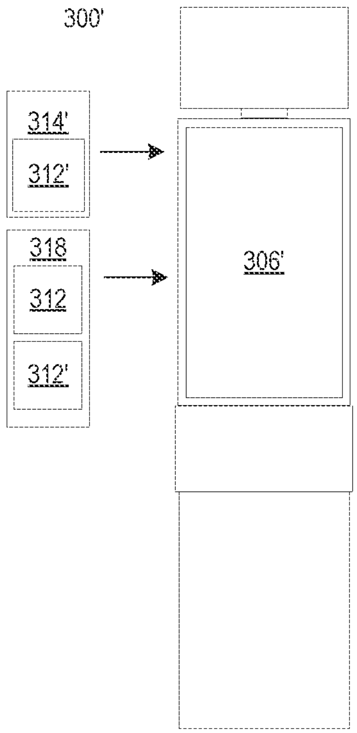

FIG. 3B illustrates a curved display gaming device 300' that includes a single curved display 306' that displays similar the same or similar game elements and graphics on the curved display 316'. To make the same game 312 available for play at the curved display gaming device 300', a different conventional game package 314' includes a modified version of the game 312' individually configured for that particular curved display gaming device 300'.

One technical drawback with this approach is that each game package 314, 314' may be configured separately as separate software products and may be subject to separate regulatory approval and scrutiny as well. In the embodiment of FIGS. 3A and 3B, however, a consolidated game package 318 may be provided to both gaming devices 300, 300'. As will be discussed below with respect to FIG. 4, the consolidated game package 318 may include the contents of both conventional game packages 314, 314', i.e., both game versions 312, 312', which can be selectively accessed through licensing protocol by the gaming devices 300, 300'. Another drawback of submitting separate configurations of the same game for regulatory approval is that many regulatory agencies approve submissions from different companies in a “round robin” format, with the agency reviewing a submission from a first company and then examining one submission from every other company before reviewing the next submission from the first company. This can result in additional delays for both the game, which may have several configurations and versions, and other games from that company, which will not be reviewed until all of the configurations and versions of the first game have been reviewed. The licensing protocol provides a technical solution to these and other problems by reducing the number of different individual game packages for distribution and regulatory approval, while allowing different game configurations or combinations thereof to be accessed by different customers, as desired. Different restrictions can be implemented at the manufacturer, distributor, and/or operator level, as desired.

In addition to hardware-specific variations of a particular game, different game configurations may also include different game rules, bet amounts, odds, and other features that may differentiate the different configurations for the game. For example, different configurations may have different Cost To Cover (CTC) value, i.e., different minimum bets to enable all the paylines for a particular game. The CTC value may be an attribute of a particular theme and/or paytable of the game, with selection of a particular theme configuring the gaming device for the selected CTC value as well. In this manner, different licenses associated with particular gaming devices may support a predetermined subset of configurations of packages contained in a consolidated game package, while restricting access to other packages in the consolidated game package. For example, a game developer can create a consolidated game package having multiple game registries associated with different licensing criteria, and different configurations that may be associated with the different game registries. Game providers and customers can view and place orders for different configurations, but with a single consolidated game product being provided.

In some embodiments the consolidated game package may contain a configuration file in their package. The configuration file provides an identifier for each configuration, and can list themes, paytables, and other features associated with different configurations. A license may be provided by the gaming device to enable any theme or configuration in the package when the configuration file is present. For example, a license dongle or software license can enable one or more configurations by listing the configuration identifiers that match the configuration identifiers in the configuration file. In some embodiments, the license may be restricted to a specific gaming device model, e.g., cabinet model. In some examples, a license configuration file may be omitted, and the entire consolidated game package may be licensed for all users, as desired. In some examples, the specific features associated with a particular game configuration do not need to be determined by a foundation or host device, which instead allow or disallow different configurations without regard to content of the configuration, based on the configurations specified by the license configuration file.

An ordering process for a consolidated game package can include ordering a particular configuration or subset of configurations. Hardware dongles may be provided in some embodiments, with a license format and/or dongle creation process providing specific licensing for different configurations and different gaming devices.

Many hardware management platforms do not have specific configurations associated with different gaming devices, e.g., cabinet models, but may instead identify specific hardware components in different gaming devices, with many cabinet models containing unique combinations of different hardware components, e.g., monitors, video cards, processors, controllers, etc. In some examples, these different hardware configurations may be stored in an identification matrix listing different cabinet models with unique cabinet identifiers and the specific hardware used on each cabinet mode.

In some embodiments, each unique cabinet can be assigned a unique identifier that is independent of a cabinet model name, which may change over time. In addition, some cabinet models may share the same combination of tracked hardware components, and some cabinet models may have optional components that may make identifying the cabinet models based on hardware configurations alone unreliable.

Figure 4:
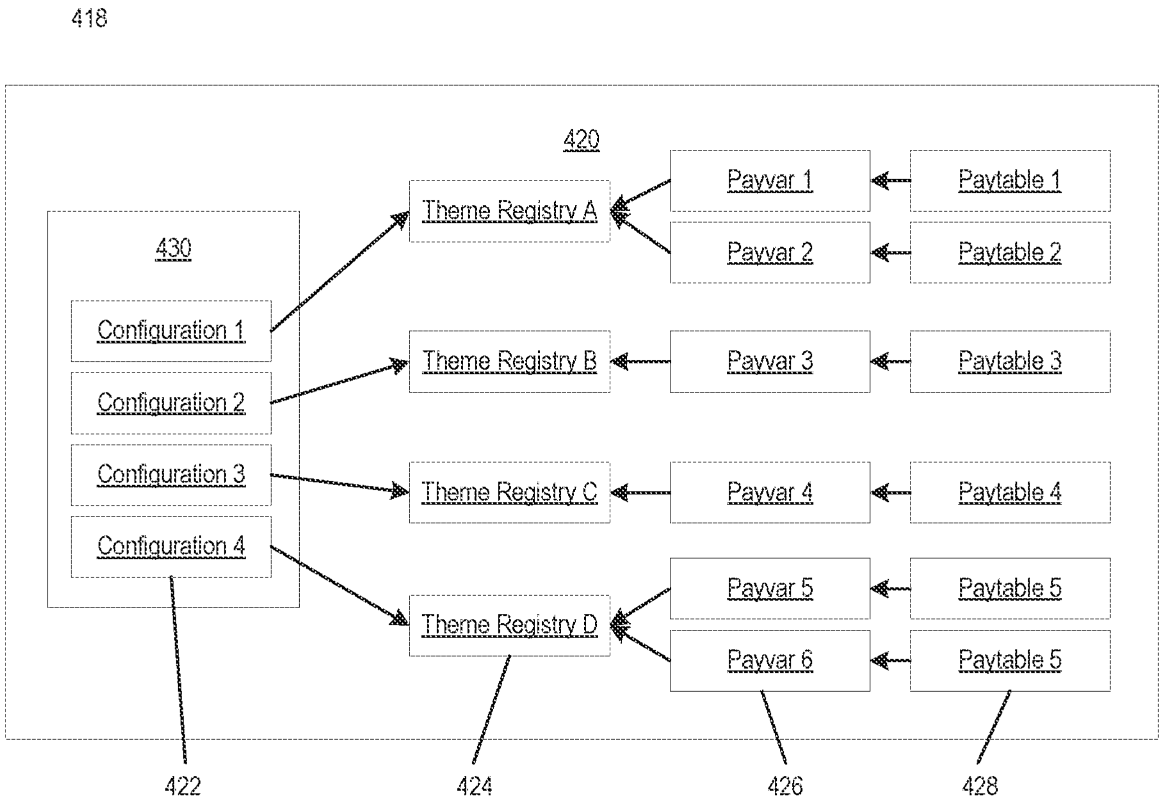
FIG. 4 is a block diagram of a software package for a consolidated game package provided on a hardware dongle, according to some embodiments.

Referring now to FIG. 4, a block diagram of a software package 400 for a consolidated game package 418 similar to the consolidated game package 318 of FIG. 3 is illustrated, according to some embodiments. In this example, the consolidated game package is provided as a single game executable file 420, e.g., a single game bin. The executable file 420 may include a plurality of configurations 422, with each configuration 422 being associated with a theme registry 424. Each theme registry 424 may include specific game features and game elements tailored to specific hardware and may also include one or more payvars 426 that defines different configurations for game play, e.g., math, odds, etc., and may further include one or more paytables 428 that define specific bet levels and payouts.

In some embodiments, the license may allow for additional configuration options, such as selecting themes and operator related selections. However, some embodiments may restrict the ability to modify criteria related to regulated components, such as modifying Return To Player (RTP) values or paytables, which may be prohibited by applicable gaming regulations, and/or which may trigger new regulatory approval requirements.

Referring back to FIG. 4, the consolidated game package 418 may include a configuration file 430 containing metadata that opts the consolidated game package 418 into configuration level licensing. Extensible Markup Language (XML) format, but it should be understood that other types of formats and/or languages may be used. In some embodiments, a legacy license may enable an entire game package, but once a game has opted into configuration level licensing, a new configuration-level license 432 with configuration data must be used to enable any part of the consolidated game package 418. No theme in the game package with a configuration file will be enabled without a new license to enable it. The configuration file 430 associates different theme registries 424 with a corresponding configuration 422 so that every theme registry 424 can be selectively enabled through the licensing of at least one configuration 422.

Figure 5:
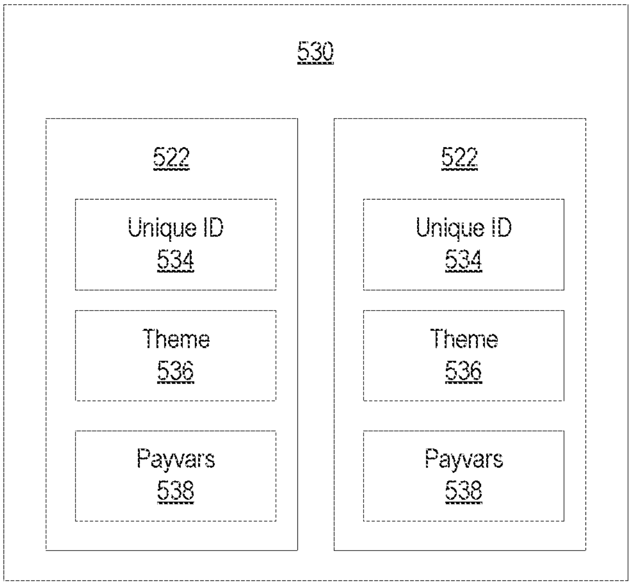
FIG. 5 is a diagram of a configuration file for a consolidated game license, according to some embodiments.

Referring now to FIG. 5, a diagram of a configuration file 530 for a consolidated game package is illustrated similar to the configuration file 430 of FIG. 4, and showing additional details, according to some embodiments. In this embodiment, the configuration file 530 contains a list of configurations 522 supported by the game package. In this example, each configuration 522 has a unique identifier 534, an allowed theme 536, and a list of allowed payvars 538, for example.

Figure 6:
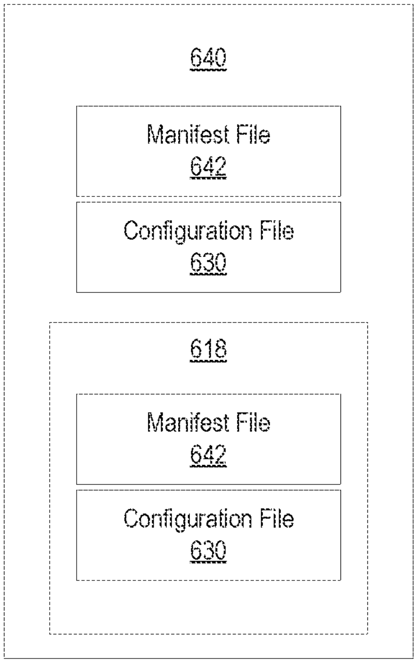
FIG. 6 is a block diagram of a compressed file containing a game package according to some embodiments.

FIG. 6 is a block diagram of a compressed file 640 containing a game package 618 according to some embodiments. In this example, the game package 618 includes a configuration file 630 and a manifest file 642 for mapping the game package 618. The compressed file 640 is a SIF/ZIP file in this example containing the manifest file 642 and the configuration file 630 at the root of the compressed file 640 as well, for the host to learn which configuration files are available for the included game package(s) 618.

Figure 7:
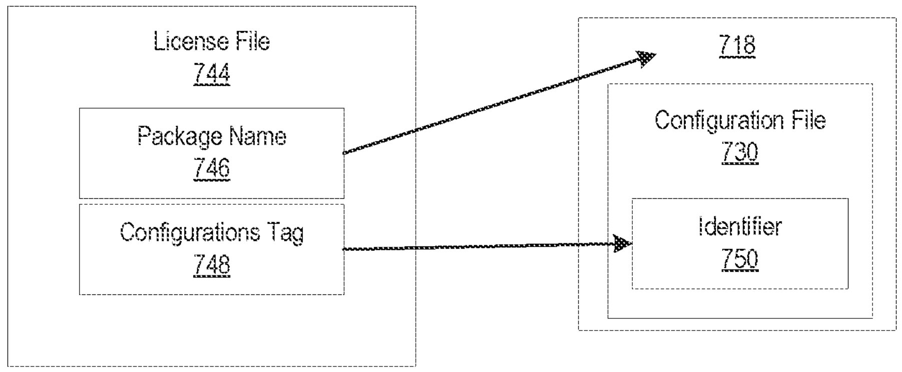
FIG. 7 is a diagram illustrating identification and authorization of a game package using a game license file, according to some embodiments.

Referring now to FIG. 7, a diagram illustrates identification and authorization of a game package 718 using a game license file 744, according to some embodiments. In this example, the license file 744 calls out a package name 746 to license. The license file 744 may also contain a configurations tag 748 that may limit which configuration(s) to allow in the called-out package name 746. The game package configuration file 730 identifies the configuration from the configurations tag 748, determines a theme identifier 750 associated with the tag 748, and enables the associated theme.

Figure 8:
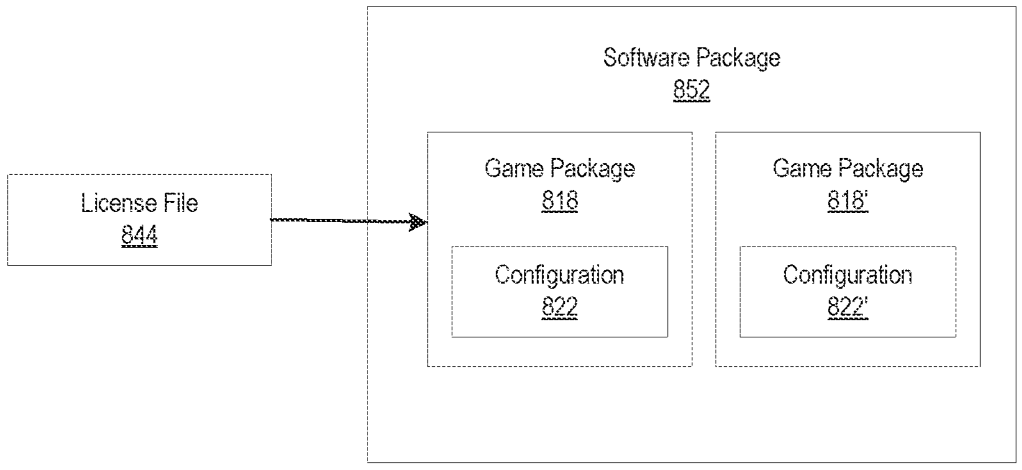
FIG. 8 is a block diagram of a software package containing game bundle with multiple configurations, according to some embodiments.

In some embodiments, multiple games and/or configurations can be bundled together in a single consolidated game package. In this regard, FIG. 8 is a block diagram of a software package 852 containing game bundle with multiple game packages 818 and configurations 822. A game bundle license file 844 references the game package(s) 818, 818' and/or configuration(s) 822, 822' that are allowed by the license. In some embodiments, the license file 944 may permit use of all configurations of a game package 818, 818' and/or the entire software package 852.

An operator may install the consolidated game package on a gaming device and view available themes and paytables on the gaming device and/or via a configuration tool of a connected device. The operator can further configure the configurations and install the license, e.g., the hardware dongle and/or software license, which determined which configurations are enabled. Upon configuration and licensing, the enabled configurations can then be played at the gaming device. Alternatively, game package may restrict further configuration of certain configurations until the configurations are enabled by the license. This may reduce inefficiency caused by operators pre-configuring configurations that might not be enabled by the operator's license.

A number of error scenarios may occur during the game configuration licensing process. For example, a license may contain one or more configurations not present in the game configuration file. A license may also contain an unknown cabinet model or hardware configuration, or a license might not include any configurations for a game package that has a configuration file. In another example, a game configuration file might list a theme, payvar, paytable, etc., that is not present in the game package.

In some embodiments, a configuration import/export feature may enable a gaming device to import configurations independently of the presence of a license for one or more of the imported configurations. A recording and reporting feature may also track the configurations in use on different gaming devices, which may aid a manufacturer, distributor, and/or operator in obtaining accurate game play and metrics across multiple configurations. In this example, the gaming device may export date including the configuration currently in use.

Figure 9:
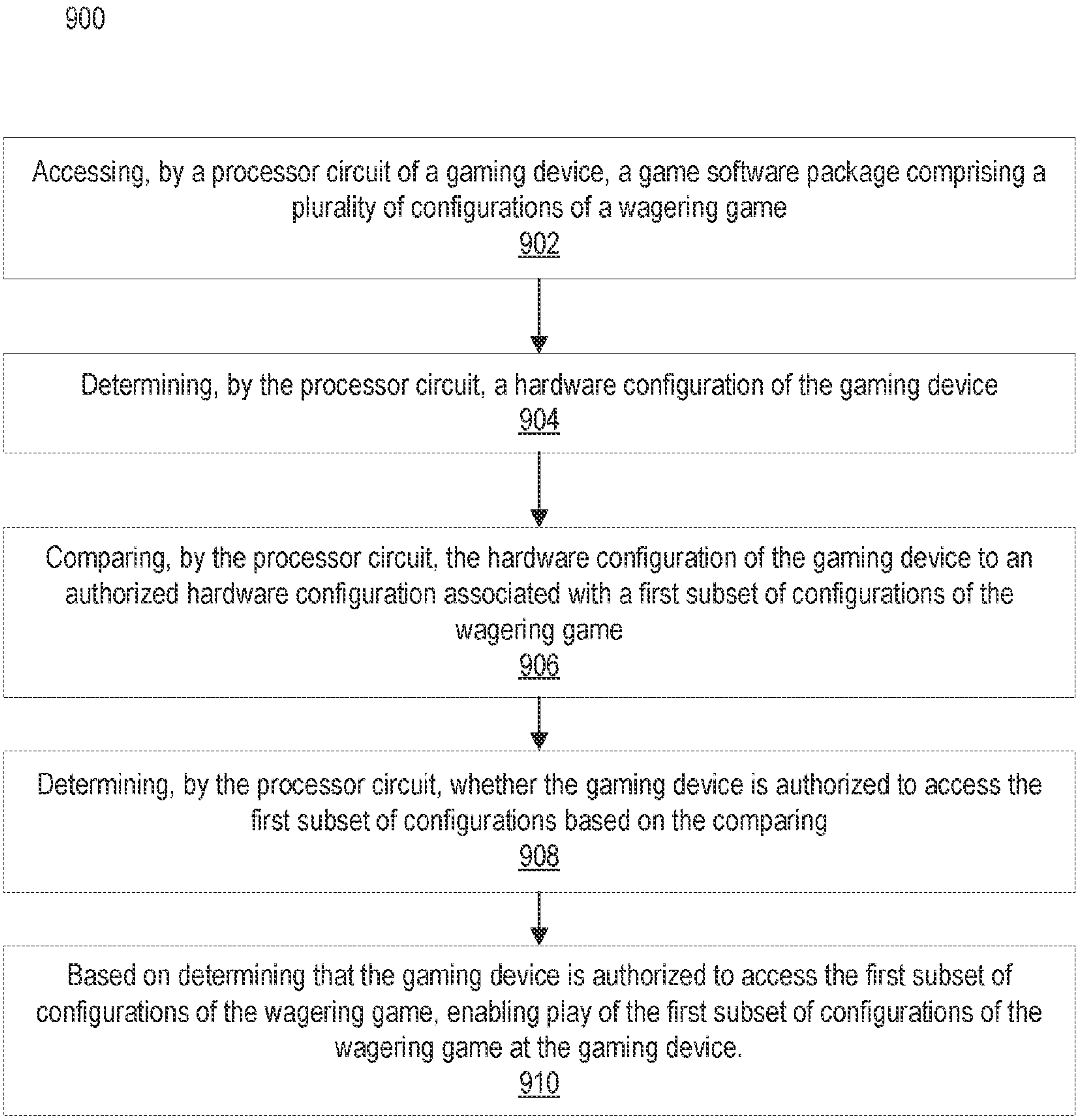
FIG. 9 is a flowchart illustrating operations of systems/methods according to some embodiments.

FIG. 9 illustrates a flowchart of operations 900 of systems/methods for authorizing configurations of a consolidate game package, according to some embodiments. The operations 900 may include accessing, by a processor circuit of a gaming device, a game software package comprising a plurality of configurations of a wagering game (Block 902).

The operations 900 may further include determining, by the processor circuit, a hardware configuration of the gaming device (Block 904). For example, each configuration may be associated with a hardware parameter value of a hardware parameter, such as a resolution of a gaming device display, a processor speed of the gaming device, etc. These parameters may be associated with minimum or recommended hardware requirements for certain configurations of the game, for example, and/or associated with specific interface elements corresponding to the hardware capabilities of the configuration.

The operations 900 may further include comparing, by the processor circuit, the hardware configuration of the gaming device to an authorized hardware configuration associated with a first subset of configurations of the wagering game (Block 906). As discussed above with respect to Block 904, the first subset of configurations may be associated with a first range of the hardware parameter values, e.g., minimum or recommended ranges. In this example, the comparison of the hardware configuration of the gaming device to the authorized hardware configuration associated with the first subset of configurations may also include comparing a hardware parameter value of the gaming device to the first range of the hardware parameter values associated with the first subset of configurations.

In some embodiments, the authorized hardware configuration may include a hardware configuration identifier of a plurality of hardware configuration identifiers, with each hardware configuration identifier corresponding to a unique combination of a plurality of hardware component identifiers, and with each hardware component identifier corresponding to a hardware component of the authorized hardware configuration. In this embodiment, comparing the hardware configuration of the gaming device to the authorized hardware configuration associated with the first subset of configurations further includes determining a combination of hardware components of the gaming device, determining a hardware configuration identifier corresponding to a combination of hardware component identifiers, which in turn correspond to the determined combination of hardware components of the gaming device. For example, the plurality of hardware component identifiers may correspond to controller components, Peripheral Component Interconnect Express (PCIe) components, display components, etc.

The comparing may further include comparing the hardware configuration identifier of the authorized hardware configuration to the determined hardware configuration identifier of the gaming device.

The operations 900 may further include determining, by the processor circuit, whether the gaming device is authorized to access the first subset of configurations based on the comparing (Block 908). In some embodiments, this determination may include determining a device identifier of the gaming device, and determining a license associated with the first subset of configurations. In this example, determining whether the gaming device is authorized to access the first subset of configurations is further based on the device identifier and the license.

In some embodiments, the determination may include retrieving a game license file from a dongle device connected to the gaming device. In this example, the determination of whether the gaming device is authorized to access the first subset of configurations is further based on the game license file.

The operations 900 may further include, based on determining that the gaming device is authorized to access the first subset of configurations of the wagering game, enabling play of the first subset of configurations of the wagering game at the gaming device (Block 910).

The operations 900 can be repeated for enabling different or additional configurations as well. For example, the processor circuit may compare the hardware configuration of the gaming device to an authorized hardware configuration associated with a second subset of configurations of the wagering game, with the processor circuit similarly determining whether the gaming device is authorized to access the second subset of configurations based on the comparing, and selectively enabling play of the second subset of configurations of the wagering game at gaming device, based on the determination.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A gaming device comprising:
- a processor circuit; and
- a memory comprising machine-readable instructions that, when executed by the processor circuit, cause the processor circuit to:
  - access a consolidated game software package comprising a plurality of configurations of a wagering game;
  - determine a software license associated with the gaming device;
  - determine, based on the software license, an authorized hardware configuration associated with a first subset of configurations of the wagering game;
  - determine a hardware configuration of the gaming device;
  - compare the hardware configuration of the gaming device to the authorized hardware configuration;
  - determine, based on the comparison, whether the gaming device is authorized to access the first subset of configurations of the wagering game; and
  - based on the determination that the gaming device is authorized to access the first subset of configurations of the wagering game, enable play of the first subset of configurations of the wagering game at the gaming device.

2. The gaming device of claim 1, wherein the instructions further cause the processor circuit to:
- determine whether the gaming device is authorized to access a second subset of configurations of the wagering game different from the first subset; and
- based on the determination that the gaming device is authorized to access the second subset of configurations of the wagering game, enable play of the second subset of configurations of the wagering game at the gaming device.

3. The gaming device of claim 1, wherein each configuration of the plurality of configurations is associated with a hardware parameter value of a hardware parameter,
- wherein the first subset of configurations is associated with a first range of the hardware parameter values, and
- wherein the comparison of the hardware configuration of the gaming device to the authorized hardware configuration associated with the first subset of configurations comprises a comparison of a hardware parameter value of the gaming device to the first range of the hardware parameter values associated with the first subset of configurations.

4. The gaming device of claim 3, wherein the hardware parameter comprises a resolution of a gaming device display.

5. The gaming device of claim 3, wherein the hardware parameter comprises a processor speed of the gaming device.

6. The gaming device of claim 1, wherein the authorized hardware configuration comprises a hardware configuration identifier of a plurality of hardware configuration identifiers, each hardware configuration identifier corresponding to a unique combination of a plurality of hardware component identifiers, each hardware component identifier corresponding to a hardware component of the authorized hardware configuration,
- wherein the comparison of the hardware configuration of the gaming device to the authorized hardware configuration associated with the first subset of configurations comprises:
  - a determination of a combination of hardware components of the gaming device,
  - a determination of a hardware configuration identifier corresponding to a combination of hardware component identifiers corresponding to the determined combination of hardware components of the gaming device; and
  - a comparison of the hardware configuration identifier of the authorized hardware configuration to the determined hardware configuration identifier of the gaming device.

7. The gaming device of claim 6, wherein the plurality of hardware component identifiers correspond to hardware components comprising:
- a plurality of controller components;
- a plurality of PCIe components; and
- a plurality of display components.

8. The gaming device of claim 1, wherein the instructions further cause the processor circuit to:
- retrieve a game license file from a dongle device connected to the gaming device, wherein the determination whether the gaming device is authorized to access the first subset of configurations is based on the game license file.

9. A method comprising:
- accessing, by a processor circuit of a gaming device, a consolidated game software package comprising a plurality of configurations of a wagering game, each configuration of the plurality of configurations associated with a hardware parameter value of a hardware parameter;
- determining, by the processor circuit, a first hardware parameter value of the hardware parameter of a hardware configuration of the gaming device;
- comparing, by the processor circuit, hardware parameter value of the hardware configuration of the gaming device to a first range of the hardware parameter values of an authorized hardware configuration associated with a first subset of configurations of the wagering game;
- determining, by the processor circuit based on the comparison, whether the gaming device is authorized to access the first subset of configurations based on the comparing; and
- based on determining that the gaming device is authorized to access the first subset of configurations of the wagering game, enabling play of the first subset of configurations of the wagering game at the gaming device.

10. The method of claim 9, further comprising:
- comparing, by the processor circuit, the hardware configuration of the gaming device to an authorized hardware configuration associated with a second subset of configurations of the wagering game;

determining, by the processor circuit, whether the gaming device is authorized to access the second subset of configurations based on the comparing; and based on determining that the gaming device is authorized to access the second subset of configurations, enabling play of the second subset of configurations of the wagering game at gaming device.

11. The method of claim 9, wherein the hardware parameter comprises a resolution of a gaming device display.

12. The method of claim 9, wherein the hardware parameter comprises a processor speed of the gaming device.

13. The method of claim 9, wherein the authorized hardware configuration comprises a hardware configuration identifier of a plurality of hardware configuration identifiers, each hardware configuration identifier corresponding to a unique combination of a plurality of hardware component identifiers, each hardware component identifier corresponding to a hardware component of the authorized hardware configuration, wherein comparing the hardware configuration of the gaming device to the authorized hardware configuration associated with the first subset of configurations comprises:

determining a combination of hardware components of the gaming device, determining a hardware configuration identifier corresponding to a combination of hardware component identifiers corresponding to the determined combination of hardware components of the gaming device; and comparing the hardware configuration identifier of the authorized hardware configuration to the determined hardware configuration identifier of the gaming device.

14. The method of claim 13, wherein the plurality of hardware component identifiers correspond to hardware components comprising:

a plurality of controller components;

a plurality of PCIe components; and a plurality of display components.

15. The method of claim 9, further comprising:

determining a device identifier of the gaming device; and determining a license associated with the first subset of configurations, wherein determining whether the gaming device is authorized to access the first subset of configurations is further based on the device identifier and the license.

16. The method of claim 9, further comprising:

retrieving a game license file from a dongle device connected to the gaming device, wherein determining whether the gaming device is authorized to access the first subset of configurations is further based on the game license file.

17. A system comprising:

a processor circuit; and a memory comprising machine-readable instructions that, when executed by the processor circuit, cause the processor circuit to:

access a consolidated game software package comprising a plurality of configurations of a wagering game;

determine a software license associated with an authorized hardware configuration for a first subset of configurations of the wagering game, the authorized hardware configuration comprising a hardware configuration identifier of a plurality of hardware configuration identifiers, each hardware configuration identifier corresponding to a unique combination of a plurality of hardware component identifiers, each hardware component identifier corresponding to a hardware component of the authorized hardware configuration;

determine a of a combination of hardware components of a gaming device;

determine a hardware configuration identifier corresponding to a combination of hardware component identifiers corresponding to the determined combination of hardware components of the gaming device;

compare the hardware configuration identifier of the authorized hardware configuration to the determined hardware configuration identifier of the gaming device;

determine, based on the comparison, whether the gaming device is authorized to access the first subset of configurations; and based on the determination that the gaming device is authorized to access the first subset of configurations of the wagering game, enable play of the first subset of configurations of the wagering game at the gaming device.

* * * * *